United States Patent
Andersen et al.

(10) Patent No.: US 7,139,108 B2
(45) Date of Patent: Nov. 21, 2006

(54) SINGLE AUTOMATIC DOCUMENT FEEDER SENSOR FOR MEDIA LEADING EDGE AND TOP COVER BEING OPENED DETECTION

(75) Inventors: Eric L. Andersen, Meridian, ID (US); Paul K. Mui, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 10/628,785

(22) Filed: Jul. 28, 2003

(65) Prior Publication Data

US 2004/0070798 A1  Apr. 15, 2004

Related U.S. Application Data

(63) Continuation of application No. 09/619,963, filed on Jul. 20, 2000, now Pat. No. 6,646,768.

(51) Int. Cl.
*H04N 1/04* (2006.01)

(52) U.S. Cl. .................. 358/474; 358/488; 358/197; 250/208.1; 250/222.1; 271/10.03

(58) Field of Classification Search ............... 358/498, 358/488, 474, 497, 400; 250/208.1, 222.1; 271/117, 157, 10.03; 399/370, 374, 367
See application file for complete search history.

(56) References Cited

U.S. PATENT DOCUMENTS

| | | | | |
|---|---|---|---|---|
| 4,791,451 A | * | 12/1988 | Hirose et al. | ............... 399/370 |
| 5,202,556 A | | 4/1993 | Kawabata et al. | |
| 5,784,680 A | * | 7/1998 | Taruki | ............... 399/374 |
| 5,878,319 A | * | 3/1999 | Itoh | ............... 399/367 |
| 5,971,388 A | * | 10/1999 | Hattori et al. | ............... 271/10.03 |
| 6,646,768 B1 | * | 11/2003 | Andersen et al. | ............... 358/474 |

FOREIGN PATENT DOCUMENTS

| | | |
|---|---|---|
| DE | 4143483 C2 | 1/1998 |
| JP | 2000-32218 | 1/2000 |
| JP | 2000032218 | 1/2000 |

* cited by examiner

*Primary Examiner*—Thomas D. Lee
*Assistant Examiner*—Heather D Gibbs

(57) ABSTRACT

A single plate flatbed scanner utilizing a single sensor to detect both opening of a lid covering the plate and the leading edge of an automatically fed document. The flatbed scanner includes a contact glass plate defining a flatbed scanning area where a document to be scanned may be manually positioned. An automatic document feeder (ADF) scan window where ADF-fed documents are scanned is defined within the flatbed scanning area. An image sensor is maintained at a fixed position in the ADF scan window while scanning ADF-fed documents. To scan a manually fed document, the image sensor moves under the flatbed scanning area so as to scan an image of the document. Since the ADF scan window and the flatbed scanning area both are defined in the same area of the contact glass plate, a document inadvertently left on the contact glass blocks the ADF scan window and prevents the scanning of an ADF fed document. A single sensor is utilized to detect the opening of the ADF which uncovers the contact glass to allow manual placement of a document. Detecting the opening of the glass plate cover is used to determine whether or not a document has been left on the glass plate after scanning. The same sensor is also utilized to detect the leading edge of an ADF fed document to initiate the scanning process at the precise time the document reaches the ADF scan window.

5 Claims, 3 Drawing Sheets

SINGLE AUTOMATIC DOCUMENT FEEDER SENSOR FOR MEDIA LEADING EDGE AND TOP COVER BEING OPENED DETECTION

RELATED PATENT APPLICATIONS

This is a continuation of and claims priority to U.S. patent application Ser. No. 09/619,963, filed Jul. 20, 2000, which is now U.S. Pat. No. 6,646,768.

FIELD OF THE INVENTION

The present invention relates generally to optical image scanning and, more particularly, in a flat plate scanner utilizing manual document feed and also having an automatic document feeder, the use of a single sensor for detecting both a leading edge of an original document input via the automatic document feeder and the opening of the flat plate top cover.

BACKGROUND OF THE INVENTION

Automated business machines for producing or reproducing hard copy documents, such as copiers, printers, telecommunications facsimile and digital sending machines, document scanners, multi-function devices (MFD), and the like, are well-known commercially. Ideally, when working with cut sheet print media, a copying or optical scanning apparatus will provide both manual document feed and automatic document feed capabilities. Often such apparatus include an automatic document feeder (ADF) mechanism for automatically loading and unloading single sheets sequentially to a functional station where the apparatus performs an operation, e.g., sequentially scanning the fed document sheets for copying, faxing, displaying on a computer monitor, or the like. Following the operation, the ADF then off-loads a sheet and feeds the immediately following sheet of the document to the functional station. A sequential flow of sheets by the ADF and positioning without the necessity of manual handling reduces the time required to accomplish the complete functional operation.

Optical scanners operate by imaging an object (from a sheet of paper, document or other form of medium) with a light source, sensing a resultant light signal with an optical sensor array. Each optical sensor in the array generates a data signal representative of the intensity of light impinged thereon for a corresponding portion of the imaged object. The data signals from the array sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photo sensor array incrementally by use of a moving scan line. The moving scan line is produced either by moving the document with respect to the scanner optical assembly, or by moving scanner optical assembly relative to the document. Either or both of these methods may be embodied in flat bed scanners, hand held scanners, or any scanner having manual and automatic feed capabilities.

Various types of photo sensor devices may be used in optical scanners. For example, a commonly used photo sensor device is the charge coupled device (CCD). A CCD builds up an electrical charge in response to exposure to light. The size of the electrical charge build up is dependent on the intensity and the duration of the light exposure. In optical scanners, CCD cells are aligned in linear array. Each cell or "pixel" has a portion of a scan line image impinged thereon as the scan line sweeps across the scanned object. The charge built up in each of the pixels is measured and discharged at regular "sampling intervals." In most modern optical scanners, the sampling intervals of the CCD arrays are fixed.

As previously mentioned, an image of a scan line portion of a document is projected onto the scanner's linear sensor array by scanner optics. In CCD scanners, the scanner optics include an imaging lens which typically reduces considerably the size of the projected image from the its original size. Pixels in a scanner linear photo sensor array are aligned in a "cross" direction, i.e., a direction parallel to the longitudinal axis of the scan line image which is projected thereon. The direction perpendicular to the "cross" direction will be referred to herein as the "scan" direction (i.e., paper or sensor linear array movement direction for scanning of the image).

At any instant when an object is being scanned, each pixel in the sensor array has a corresponding area on the object which is being imaged thereon. This corresponding area on the scanned object is referred to herein as an "object pixel" or simply "pixel." An area on a scanned object corresponding in area to the entire area of the linear sensor array is referred to herein as an "object scan line" or simply "scan line." For descriptive purposes, a scanned object is considered to have a series of fixed adjacently positioned scan lines. Further, scanners are typically operated at a scan line sweep rate such that one scan line width is traversed during each sampling interval.

Differentiating from scanners employing CCDs, a contact image sensor (CIS) and CIS drive roller are commonly employed in document fed scanners for imaging the medium being passed (fed) through the scanner. The CIS is spring loaded against the drive roller and forms a nip therebetween. The medium being scanned is presented for scanning at the nip and is pulled past the CIS by the drive roller. The CIS typically includes a glass plate adjacent the roller (forming the nip), an array of light sources, such as light emitting diodes (LEDs), directed at the nip, an array of self-focusing lenses (cylindrical microlenses) that direct and focus the light from the light sources as reflected off the medium (or roller if no medium is present), and an array of photo sensors adjacent the self-focusing lenses for converting the light passed through the lenses to electrical signals for processing of the image generated. An advantage of the CIS is that it is less susceptible to having foreign particles (e.g., dust) settle on the CIS optics which could degrade the scanned image quality. A CIS is less susceptible to foreign particles because it has fewer reflecting optics, relative to CCD scanner devices, for focusing the light. Another advantage of the CIS is its small size due to its optical configuration.

It is known to provide a single plate flatbed scanner including an automatic document feeder which automatically feeds documents page by page. Each document fed into the ADF is conveyed to a scanning point or portion of the flat plate where the document is scanned by an image sensor and then the document is conveyed to a point outside the ADF, such as a document output tray. Typically, the image sensor remains fixed at the scanning point "reading" or scanning the image as the document is conveyed past the scanning point by the ADF. Another feature of the flatbed scanner allows a user to manually place or position an original document on the flat plate to be scanned. The document lays flat on and covers a portion of the flat plate while the image scanner is moved under the plate the length (or width) of the document to read or scan the document. In many flatbed scanners, the scanning point or portion of the flat plate used to scan a document provided by the ADF is separate and distinct from the portion of the flat plate utilized to scan a document manually positioned on the plate.

In some flatbed scanners, in order to reduce the size of the flat plate (and the overall size of the scanner), it is also known to utilize a portion of the flat plate for the scanning point for documents fed by an ADF ("ADF scan window") which also forms a part of the flat plate portion for scanning documents manually positioned on the plate. However, a document manually placed on the plate will typically cover the entire plate including the ADF scan window. Thus, if a manually-placed document has been inadvertently left on the flat plate when a user attempts to scan a document using the ADF, the ADF scan window will be blocked, i.e., covered, and the ADF fed document will not be scanned. For this reason, many scanners, especially those used in multi-function devices, will employ a sensor to detect opening of the flat plate lid or cover.

Automatic document feeders typically also utilize sensors for detecting a leading edge of a document as it is withdrawn from an input or supply tray and fed into the scanner. From the point in time that the leading edge is detected, the amount of time required to convey the leading edge to the imaging sensor is monitored so that the imaging sensor may initiate actual imaging (scanning) at the precise time when the leading edge of the document reaches the imaging sensor. This amount of time will be more or less depending on the relative location of the sensor, or sensors, in the ADF document feed path.

Thus, a flatbed scanner employing an ADF may have at least two sensors, one to detect a document leading edge and one to detect the opening of the flat plate lid or cover. In order to reduce cost and component numbers, what is needed is a way to eliminate one or more of the presently used sensors yet maintain the required functionality.

SUMMARY OF THE INVENTION

In a preferred embodiment, the present invention is implemented in a single plate flatbed scanner including an automatic document feeder (ADF) which employs a single sensor to detect both a document leading edge for an ADF fed document and the opening of the flat plate cover. At least one sensor is eliminated thus reducing the number of components and the cost of manufacture while continuing to provide desired functionality.

A preferred embodiment of a flatbed scanner according to the present invention providing both automatic and manual document input includes a single contact glass plate mounted on a main body. The contact glass plate defines a flatbed scanning area where an original document may be manually positioned. Additionally, an ADF scan window where ADF-fed documents are scanned is defined within the flatbed scanning area. An image sensor assembly, such as a CCD sensor or a CIS sensor, for example, is maintained at a fixed position under the glass plate in the ADF scan window while scanning ADF-fed documents. To scan a manually fed document, the image sensor assembly moves under the flatbed scanning area so as to scan an image of the document manually positioned on the glass plate. An automatic document feeder is arranged on the main body covering the contact glass and mounted to be openable to expose the contact glass to allow the manual placement on the flatbed scan area of a document original to be scanned. The automatic document feeder conveys an original document to be scanned along a feed path to the ADF scan window at the image sensor assembly fixed position, conveying the original document over and past the image sensor assembly and ejecting the original document along an ejecting path from the fixed position. The scanner of the present invention includes a detector adapted both to detect when the automatic document feeder is opened and to detect a leading edge of an original document whenever a document page is conveyed along the feed path to the ADF scan window.

In a preferred embodiment of the present invention, an optical switch is operatively mounted on the ADF and detects both the leading edge of an ADF fed document page and the opening of the ADF to expose the surface of the contact glass plate. Preferably, the optical switch provides a light beam which is interrupted by a swing arm to generate an electrical signal. The optical switch and swing arm are mounted such that one end of the swing arm projects into the ADF feed path to operatively engage each sheet or page of an ADF fed document to generate an electrical signal indicative of the leading edge of a page prior to the document page reaching the image sensor fixed position in the ADF scan window. The optical switch and swing arm are mounted to additionally operatively cooperate with the scanner main body to generate an electrical signal indicative of the opening of the ADF to expose the contact glass plate.

Other embodiments and advantages of the present invention will be readily appreciated as the same become better understood by reference to the following detailed description, taken in conjunction with the accompanying drawings. The claims alone, not the preceding summary or the following detailed description, define the invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the following detailed description illustrate by way of example the principles of the present invention. The components in the drawings are not necessarily to scale, emphasis instead being placed upon clearly illustrating the principles of the present invention. In the drawings like reference numbers indicate identical or functionally similar elements throughout the several views thereof, and wherein.

DETAILED DESCRIPTION OF THE INVENTION

Figure 1:
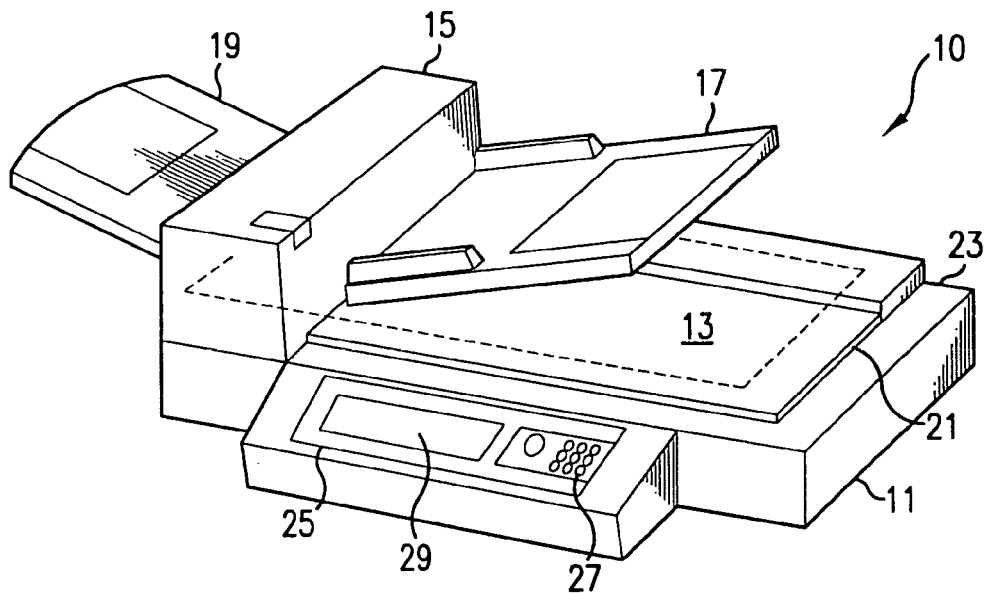
FIG. 1 is a perspective view of a flatbed scanner embodied with features according to the principles of the present invention.

As shown in the drawings for purposes of illustration, the present invention is embodied in a single plate flatbed scanner including an automatic document feeder (ADF)

which employs a single sensor to detect both a document leading edge for an ADF fed document and the opening of the flat plate cover. At least one sensor is eliminated thus reducing the number of components and the cost of manufacture while continuing to provide desired functionality previously requiring two or more sensors.

Referring now to FIG. 1, a perspective view of a flatbed scanner in which the present invention can be implemented is shown. The flatbed scanner 10 includes a main body or frame 11, a contact glass plate 13 (outlined by a dashed line), and an automatic document feeder (ADF) 15. The ADF 15 includes a document input or infeed tray 17 and an output or outfeed tray 19. A lid or cover 21 covers the surface of the contact glass plate 13 during operation of the scanner 10. Typically, the lid 21 will be an integral component of the ADF 15. The ADF 15 is arranged on top of the main body 11 and is pivotally mounted, such as hinged along the back edge 23 of the main body, for example, to allow the contact glass plate 13 to be exposed. In operation, a user inserts an original document to be scanned into input tray 17. Individually scanned pages are then collected in output tray 19, after each page of the original document has been scanned. Alternatively, a user may lift the lid 21 by rotating the ADF 15 about the main body back edge 23 to expose the contact plate glass plate 11. An original document is then placed on the contact glass plate 13 (as shown in FIG. 2) and the lid 21 closed while the document is scanned.

The flatbed scanner 10 may be used as a stand alone unit or may be a component of a multiple function device (MFD) having scanning, printing and copying capabilities, and may, additionally, include facsimile and digital sending capabilities (not shown). The flatbed scanner 10 includes user interface unit 25 which enables a user to submit jobs for the scanner. The user interface unit 25 may be more or less complex as a function of the use of the scanner, such as a stand alone scanning device or an MFD. For example, in an MFD providing both printing and copying capabilities, user interface unit 25 enables a user to configure copy characteristics of the copier unit (not shown) and includes a key or keypad 27 and a display screen 29.

Figure 2:
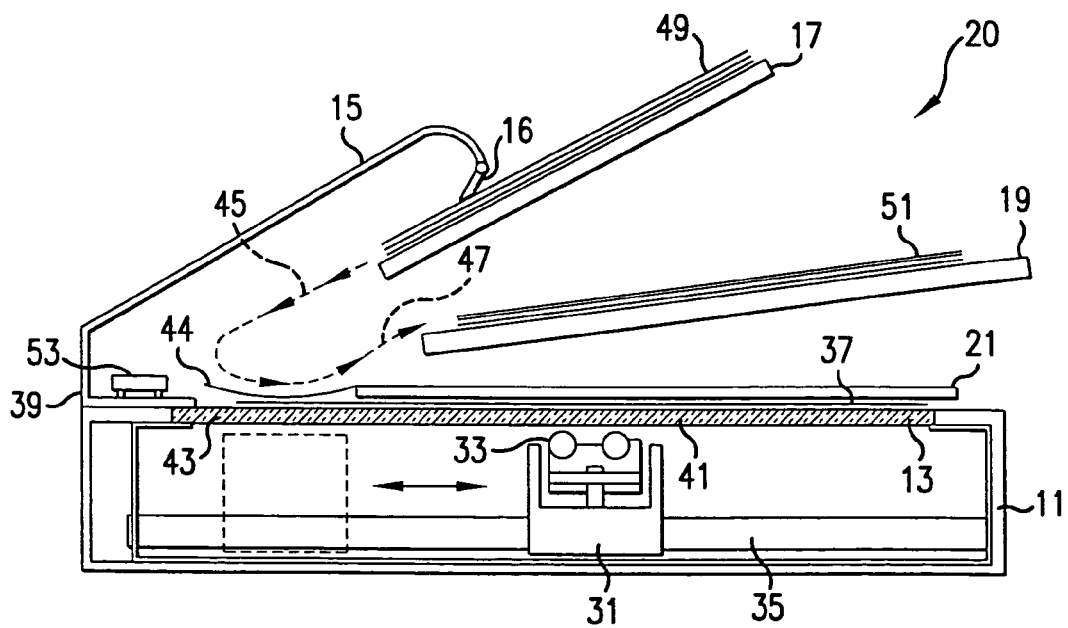
FIG. 2 is a cross-sectional view of another flatbed scanner embodied with features according to the principles of the present invention.
Figure 3:
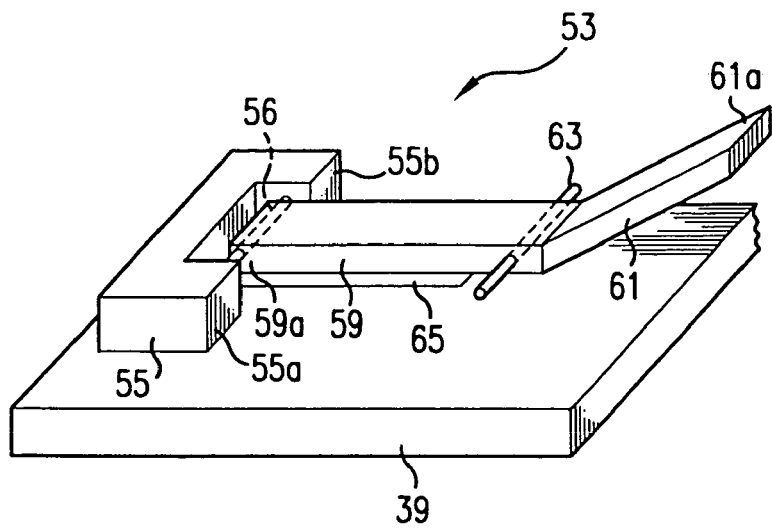
FIG. 3 is a perspective view of an optical switch according to the present invention.

Referring now also to FIG. 2, a cross-sectional view of another flatbed scanner embodying the present invention is shown. The flatbed scanner 20 includes a contact glass plate 13 mounted on a main body 11, a carriage 31 carrying an image sensor assembly 33, such as a CCD sensor or a contact image sensor (CIS), for example, along a guide shaft 35, and an ADF 15 including an input tray 17 and an output tray 19. The flatbed scanner 20 is similar in construction to the scanner 10 shown in FIG. 1 with the exception that the input tray 17 is arranged on the same side of the ADF 15 as the output tray 19 resulting in a more compact unit suitable for desktop use. The contact glass plate 13 is placed on a top of the main body 11, and an original document 37 to be scanned is placed thereon. The ADF 15 is arranged on top of both the main body 11 and the contact glass plate 13, the lid or cover 21 covering the contact glass plate 13. The carriage 31 on which the image sensor assembly 33 is mounted is moved in an area positioned under the contact glass plate 13. In operation, in a manner known in the art, the carriage 31 may be reciprocally moved along the guide shaft 35.

The contact glass plate 13 defines a flatbed scanning area 41 where an original document may be manually positioned on the contact glass. Additionally, an ADF scan window 43 where ADF-fed documents are scanned is defined on the contact glass plate 13. In the flatbed scanner 20, the ADF scan window 43 is preferably defined within the flatbed scanning area 41. As explained above with reference to the input and output trays 17 and 19, respectively, defining the ADF scan window 43 within the flatbed scanning area 41 allows the contact glass 13 to be shorter in physical length thus providing a smaller scanner unit. The ADF scan window 43 portion of the contact glass plate 13 may be covered with a transparent plate or sheet 44 of suitable material, such as a plastic or polyester material, for example. The carriage 31 together with the image sensor assembly 33 is maintained at a fixed position under the contact glass plate 13 in the ADF scan window 43 while scanning ADF fed documents. To scan a manually fed document 37, the carriage 31 along with the image sensor assembly 33 moves under the flatbed scanning area so as to scan an image of the document 37 manually positioned on the contact glass plate 13.

The ADF 15 is a single unit including a frame 39, the input tray 17, the output tray 19 and the lid or cover 21. The ADF 15 is pivotally mounted on the top of the main body 11 allowing the ADF together with lid 21 to be raised or lifted to expose the top surface of the contact glass plate 13. In a known manner, the ADF 15 includes various conveying rollers and guides, including the transparent sheet 44 covering the ADF scan window 43, to form a document input feed path 45 and an output ejecting path 47 for feeding original documents through the scanner, over the ADF scan window 43, to be scanned. In operation, a user inserts the pages of an original document 49 to be scanned into input tray 17. After pushing a "start" button, located, for example, on the user interface unit 25, one or more input pick-up and conveying rollers (not shown) feed pages of the document 49 one by one from the input tray 17 and convey the pages over and past the ADF scan window 43 where each page of the document is scanned by the stationary image sensor assembly 33. The original document is scanned at the instant of passing through the ADF scan window 43, separated from the contact glass plate 13 by the transparent sheet 44 covering the ADF scan window. Individually scanned pages 51 are then conveyed along the output ejecting path 47 and collected in output tray 19 after each page of the original document has been scanned.

In the above-described construction, when an original document, such as a book-type or other type of document not convenient or suitable for automatic feeding, is manually fed, the ADF 15 including the lid 21 is raised and the original document 37 is positioned on the contact glass plate 13 covering the flatbed scanning area 41. The ADF 15 is then lowered, the lid 21 covering the document 37. After a start button (not shown), such as may be provided at keyboard 27 or an icon on display 29, for example, is pushed, the carriage 31 moves under the contact glass 13 along guide shaft 35 conveying the image sensor assembly 33 through a range defining the flatbed scanning area 41. Scanning of the original document 37 is performed while the carriage 31 is moving at a range corresponding to a size of the original document 37.

When an ADF for automatically feeding an original document through the scanner is employed, it becomes to know the proper timing to initiate (and when to terminate) the actual scanning process for each page of document. Typically, most ADFs employ one or more sensors for detecting a leading edge of the document page as it is automatically grabbed or picked from the input tray 17 and fed into the scanner 20. From the point in time that the sensor(s) detect the leading edge, the amount of time required to convey the document leading edge to the image sensor assembly 33 is monitored so that actual imaging may be initiated at the precise time when the leading edge of the document page reaches the image sensor assembly 33.

Typically, the ADF will employ the same or different sensor(s) to detect the passage of the document trailing edge to terminate the scanning process as the document trailing edge passes through the ADF scan window 43. It is known to use different types of sensors to detect the document lead edge, such as mechanical or optical switches or combinations of optical and mechanical switches. For example, a known sensor scheme utilizes a photo sensor array to sense light reflected off a white drive roller to detect a shadow in front of a document leading edge being exposed to a light source. Typically, most scanners will also employ a sensor to detect the presence of a document in the input tray. For example, a simple toggle switch 16 pivotally mounted over the input tray 17 on the ADF frame 39 is responsive to a document being placed in the input tray to generate an electrical signal indicative of a document being present in the input tray 17.

In the flatbed scanner 20 described with reference to FIG. 2, since the ADF scan window 43 is defined within the flatbed scanning area 41, an original document positioned on the contact glass plate 11 covering the flatbed scanning area 41 will also cover a portion or all of the ADF scan window 43. Thus, a document inadvertently left on the contact glass plate 11 covering a portion or all of the ADF scan window 43 will interfere with the scanning of an ADF fed document because the image sensor assembly 33 will be partially or completely blocked. In any flatbed scanner which employs the same area of the contact glass plate for both the ADF scan window and the flatbed scanning area, it becomes important to determine whether or not an original document is present covering the contact glass plate. Most ADFs of this type employ one or more sensors to detect the opening of the lid covering the contact glass plate. The presence or absence of a document on the contact glass plate is determined by logic circuitry responsive to electrical signals generated by sensors which detect the opening of the lid.

In a preferred embodiment, the present invention is implemented in a sensor employed to detect the leading edge of an ADF fed original document. For each document page 49 picked form the input tray 17 and conveyed along the input feed path 45 to the ADF scan window 43, a sensor 53 detects the document leading edge prior to the leading edge reaching the image sensor assembly 33. When the document leading edge is detected, the sensor 53 generates an electrical signal which is then utilized to calculate the precise time to initiate the scanning process for that document page. In a preferred embodiment, the sensor 53 is also used to detect the document trailing edge and generates another electrical signal which terminates the scanning process for that document page. Alternatively, a different method may be employed to terminate the scanning process for a particular document page, such as a preset scan time based on the document size and the speed that the document is conveyed past the image sensor assembly 33, for example. The same sensor 53 is also employed to detect the opening of the lid 21.

Preferably, the sensor 53 is mounted on the ADF frame 39 in such a manner that when the ADF 15, and hence also the lid 21, is opened, an electrical signal is generated indicating that the lid 21 has been opened. Alternatively, the sensor 53 may be suitably mounted on the scanner main body 11. Any suitable sensor appropriately mounted to provide detection of an ADF fed document leading edge and also detection of the opening of the lid 21 may be used for this purpose. For example, the sensor 53 may be a light source (not shown) used in combination with a photo sensor array (not shown). The light source may be mounted on the scanner main body 11 in such a manner that when the ADF 15 is closed (i.e., the ADF and lid 21 covering the contact glass plate 13) the light source provides a light beam projecting through the input feed path 45 to the photo sensor array. An ADF fed document being conveyed along the input feed path would interrupt the light beam thus causing the photo sensor array to generate an electrical signal when the light beam was interrupted. Similarly, when the ADF 15 (and the lid 21) was raised, the path of the light beam would be interrupted also causing the photo sensor array to generate an electrical signal.

Figure 4A:
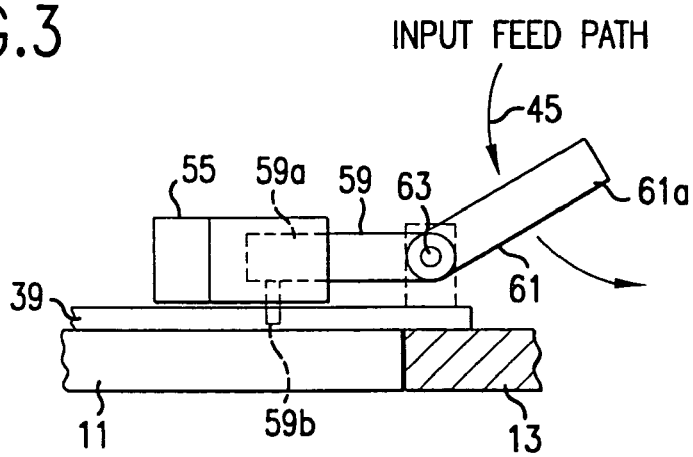
FIGS. 4A, 4B and 4C are cross-sectional views of the switch of FIG. 3 illustrating the switch mounted in a scanner automatic document feeder with the scanner lid in closed and opened positions.

Referring now also to FIGS. 3, 4A, 4B and 4C, in a preferred embodiment, the sensor 53 is an optical switch 55 projecting a light beam 56 between two legs 55a and 55b in combination with a pivotally mounted swing member 57. The swing member 57 includes two swing arms 59 and 61 extending in opposite directions at angle, preferably an acute angle, to each other. The optical switch 55 and the swing member 57 are mounted to the ADF frame 39 in close proximity and arranged such that the free end of one swing arm 59a, arm 59, for example, when pivoted or rotated about shaft 63, passes through a slot formed by the two optical switch legs 55a and 55b. The optical switch 55 and swing member 57 are further mounted and arranged on the ADF frame 39 such that when the ADF 15 (and lid 21) is closed, and the frame 39 is resting on the scanner main body 11, the swing arm 59 is supported such that its free end 59a is held in a more or less horizontal position between the legs 55a and 55b of the optical switch interrupting the light beam 56. In one preferred embodiment, the free end 59a of swing arm 59 includes a protrusion 59b projecting downwards from its lower side through a slot 65 in frame 39, extending to and resting on the scanner main body 11 to support the swing arm in an approximate horizontal position when the ADF 15 (and lid 21) is closed. When the ADF 15 (and the lid 21) is closed, the free end of the other swing arm 61a, arm 61, for example, projects through the document input feed path 45 (as shown in FIG. 4A).

Figure 4B:
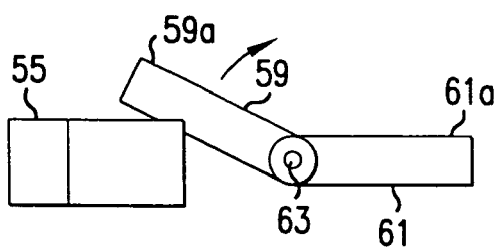

In operation, when the ADF 15 (and the lid 21) is closed, the swing arm 59 is held in an approximate level position with the swing arm end 59a positioned between the optical switch legs 55a and 55b interrupting the light beam 56 with the other swing arm 61 free end 61a projecting through the input feed path 45. When an original document is picked from the input tray 17 and conveyed along the input feed path 45 to the ADF scan window 43, the leading edge of the ADF fed document will engage the swing arm 61 pushing the free end 61a out of the input feed path and causing the swing member 57 to rotate about the shaft 63 thus causing the other swing arm 59 to rotate the free end 59a out from between the optical switch legs 55a and 55b (as shown in FIG. 4B). The light beam 56 is no longer interrupted and an electrical signal is generated indicating the detection of the ADF fed document leading edge. Since the swing arm free end 61a is actually in the input feed path, an ADF fed document will continue to hold the swing arm free end 61a out of the input feed path as the document is conveyed past the swing arm 61. When the trailing edge of the document is past the point that the swing arm free end 61a projects into the input feed path, the swing member 57 again pivots about the shaft 63 rotating the swing arm 59 in the opposite direction to position the free end 59a horizontally between the optical switch legs 55a and 55b interrupting the light beam 56. The optical switch 55 now generates a second electrical signal indicative of the passage of the ADF fed document trailing edge. These two signals can be utilized to initiate and terminate, respectively, the scanning process at the ADF scan window 43 for the document.

Figure 4C:
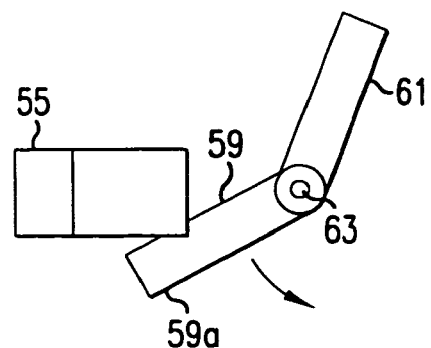

When a user desires to manually position an original document on the contact glass plate for scanning, the ADF 15 (and lid 21) must first be opened. As described above, the swing arm 59 is supported by the scanner main body 11 with the free end 59a positioned between the optical switch legs 55a and 55b. When the ADF 15 (and the lid 21) is raised, the support for the swing arm 59 is removed and the swing member 57 will pivot about the shaft 63 causing the swing arm 59 to rotate in a downwards direction (towards the scanner main body 11), the free end 59a rotating out from between the optical switch legs 55a and 55b (as shown in FIG. 4C). The light beam 56 is no longer interrupted and an electrical signal is generated indicating the detection of the ADF 15 (and the lid 21) has been opened. When the ADF 15 (and the lid 21) is closed, the swing arm 59 is rotated in the opposite (upwards) direction again positioning the free end 59a between the optical switch legs 55a and 55b causing the optical switch 55 to generate a second electrical signal indicating the ADF 15 (and the lid 21) has been closed.

Figure 5:
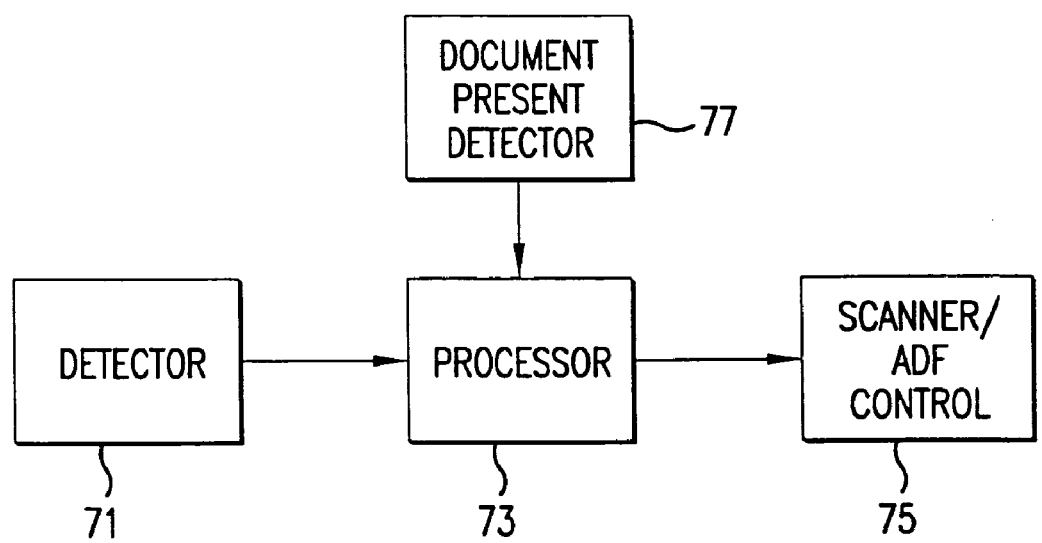
FIG. 5 is a functional block diagram for control of the automatic document feeder of the scanner shown in FIGS. 1 and 2.

Referring now also to FIG. 5, a functional block diagram for control of the automatic document feeder of the flatbed scanner 20 is shown. Signals generated by the detector 71, sensor 53 as described above, for example, are coupled to a processor 73 or other logic circuitry provided for control of the flatbed scanner 20. As described above, electrical signals indicative of the detection of an ADF fed document leading and trailing edges are processed in a known manner to generate image scanning control signals which are further coupled to a scanner/ADF controller 75. Similarly, electrical signals generated by the detector 71 indicative of the opening/closing of the ADF 15 (and the lid 21) are processed by the processor 73 in a known manner to determine whether or not an original document has been inadvertently left on the contact glass plate 13 prior to initiating use of the ADF 15 to automatically feed an original document to the scanner 20. In a preferred embodiment, when the processor 73 has determined that it is probable an original document 37 has been left on the contact glass plate 13, the processor 73 generates a signal which is coupled to the scanner/ADF controller 75. When a user now attempts to initiate automatic feeding of an original document with the ADF 15, the scanner/ADF controller 75 will block operation of the ADF 15 and send a warning, preferably a message displayed on a display, directing the user to check the contact glass 13 for an original document. Once it is determined that the original document 37 has been removed from the contact glass plate 13, such as the receipt of signals generated by the detector 71 indicating that the ADF 15 (and the lid 21) has been opened and closed, the scanner/ADF controller 75 will operation of the ADF 15 to proceed. In a preferred embodiment, the ADF 15 includes a document present detector 77, such as an optical detector or a mechanical toggle switch detector 16 (as shown in FIG. 2), for example, to determine whether or not an original document 49 is present in the input tray 17. Since most scanners employ a single "start" button to initiate scanning operation for both ADF fed documents or manually fed documents, if the document present detector 77 indicates that a original document 49 is present in the input tray 17, the scanner/ADF controller 75 will assume that ADF operation is being initiated if the start button is pushed. Alternatively, in some embodiments, the absence of an original document 37 on the contact glass plate 13 indicates that ADF operation is being initiated by the start button.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed is:

1. An image scanner comprising:
   a single contact glass disposed on a main body, the contact glass having a first range through which a first original document is passed to be scanned, and a second range over which a second original document is positioned to be scanned, the second range including the first range;
   an image sensor scanning the first original document at a fixed position in the first range and scanning the second original document while the image sensor moves through the second range;
   an automatic document feeder arranged on the main body covering the contact glass and being openable to expose the contact glass, the automatic document feeder conveying the first original document through a feed path to the fixed position and ejecting the first original document through an ejecting path from the fixed position; and
   a single detector adapted to detect both when the automatic document feeder is opened and to detect a leading edge of the first original document whenever a document page is conveyed along the feed path to the first fixed position.

2. The image scanner as in claim 1 wherein the detector is operatively mounted on the automatic document feeder.

3. The image scanner as in claim 2 wherein the detector comprises an optical switch.

4. The image scanner as in claim 3 wherein the optical switch provides a light beam which is operatively interrupted by a pivotally mounted swing member.

5. The image scanner as in claim 1 further comprising an automatic document feeder controller, the detector electrically coupled to the controller, the controller responsive to signals generated by the detector for preventing the conveyance of a document page of the first original document to the fixed position whenever a document page of the second original document is positioned on the contact glass in the second range.

* * * * *